United States Patent [19]
Park

[11] Patent Number: 5,953,373
[45] Date of Patent: Sep. 14, 1999

[54] EQUALIZING CIRCUIT AND METHOD FOR DATA COMMUNICATION TERMINAL EQUIPMENT

[75] Inventor: Joo-Seung Park, Gumi, Rep. of Korea

[73] Assignee: SamSung Electronics Co., Ltd., Kyungki-do, Rep. of Korea

[21] Appl. No.: 08/679,441

[22] Filed: Jul. 12, 1996

[30] Foreign Application Priority Data

Jul. 12, 1995 [KR] Rep. of Korea ........................ 95-20510

[51] Int. Cl.⁶ .............................. H03H 7/30; H03H 5/00; H04M 1/00
[52] U.S. Cl. .......................... 375/229; 375/230; 379/390; 333/28 R
[58] Field of Search ..................................... 375/229, 230, 375/344, 303, 334; 379/390, 394, 398, 364, 365; 333/17.1, 18, 28 R; 332/126; 358/174

[56] References Cited

U.S. PATENT DOCUMENTS

| | | | |
|---|---|---|---|
| 3,656,064 | 4/1972 | Giles et al. | 329/103 |
| 4,151,490 | 4/1979 | Bazin | 333/18 |
| 4,934,983 | 6/1990 | Miyo | 455/8 |
| 5,025,443 | 6/1991 | Gupta | 370/494 |
| 5,124,673 | 6/1992 | Hershberger | 333/18 |
| 5,150,380 | 9/1992 | Okanoue | 375/230 |
| 5,276,517 | 1/1994 | Matsuzawa et al. | 358/174 |
| 5,349,444 | 9/1994 | Amano et al. | 348/711 |
| 5,418,816 | 5/1995 | Yamamoto | 375/230 |
| 5,550,925 | 8/1996 | Hori et al. | 381/98 |
| 5,642,381 | 6/1997 | Hirayama | 375/229 |
| 5,838,875 | 11/1998 | Cho et al. | 386/123 |

OTHER PUBLICATIONS

Communucations, Computer Networks, and Open Systems (Fred Halsall, 1996, pp. 50–51).

*Primary Examiner*—Chi H. Pham
*Assistant Examiner*—Khai Tran
*Attorney, Agent, or Firm*—Robert E. Bushnell, Esq.

[57] ABSTRACT

An equalizing circuit and method for data communication terminal equipment includes: a level detecting unit for detecting respective levels of a high frequency signal and a low frequency signal which are frequency shift keying signals inputted through a telephone line during a handshake and for outputting the detected respective levels; a control unit for comparing the levels of the high and low frequency signals detected by the level detecting unit and for generating a frequency compensation amplification control signal according to a level difference between the high and low frequency signals; and an equalizing unit for inputting a level detection signal outputted from the level detecting unit and for compensating any attenuation and distortion of received signals in response to the frequency compensation amplification control signal of the control unit, so as to effect equalization.

10 Claims, 4 Drawing Sheets

EQUALIZING CIRCUIT AND METHOD FOR DATA COMMUNICATION TERMINAL EQUIPMENT

CLAIM OF PRIORITY

This application make reference to, incorporates the same herein, and claims all benefits accruing under 35 U.S.C §119 from an application entitled EQUALIZING CIRCUIT AND METHOD OF DATA COMMUNICATION TERMINAL EQUIPMENT earlier filed in the Korean Industrial Property Office on Jul. 12th, 1996 and assigned Ser. No. 95/20510.

BACKGROUND OF THE INVENTION

1. Field of the Invention

The present invention relates to an equalizing circuit and method for communication terminal equipment, and more particularly, to an equalizing circuit and method for compensating for the attenuation and distortion of signals received through a public telephone network.

2. Description of the Related Art

In general, data communication terminal equipment includes a key phone system and a facsimile system, etc., and among the rest, the facsimile system is used for transmitting/receiving a document. In this facsimile system, the transmission and reception of image data of the document are performed according to a process of a protocol after a document is inserted in the document feeding cassette and a receiving party's telephone number is then dialed. The protocol for transmitting and receiving the document is prescribed in a CCITT recommendation, and the protocol in accordance with CCITT.41420 is performed through five phases as shown in the following Table <1>.

TABLE 1

|  | CALLING TRANSMITTER | CALLED RECEIVER |
| --- | --- | --- |
| PHASE A | CALLING(CNG) | CALLED STATION IDENTIFICATION(CED) |
| PHASE B | COMMAND INFORMATION (NSS + TSI + DCS) TRAINING (HIGH SPEED) (9600/7200/4800/2400) | CAPABILITIES IDENTIFICATION (NSF + CSI + DIS) RECEPTION CONFIRMATION (CFR) |
| PHASE C | MESSAGE HIGH SPEED (9600/7200/4800/2400) |  |
| PHASE D | END OF MESSAGE (EOP/MPS/EOM/RPI-Q) | RECEPTION CONFIRMATION (MCF/RTP/RTN/PIP/PIN) |
| PHASE E | DISCONNECT THE LINE (DCN) |  |

As shown in Table <1>, in phase A, which is a call setup phase, the calling transmitter and the called receiver exchange the CNG and CED signal with each other. In phase B, which is a premessage procedure phase, the calling transmitter and the called receiver exchange the NSS+TSI+DCS and NSF+CSI+DIS and CFR signals with each other. The phase C is a phase for transmitting a fax message (image data). Furthermore, the phase D is a postmessage procedure phase and in this phase, the calling transmitter and the called receiver exchange the EOP/MPS/EOM/RPI-Q and the MCF/RTP/RTNIP/PIN with each other, and the phase E is a phase of transmitting the DCN signal and releasing the call.

However, in the facsimile system as described above, as a cable length of the public telephone network is extended, signals transmitted through this cable are attenuated as shown in FIG. 1A. Particularly, signals of a high frequency are attenuated more than signals of a low frequency due to a capacitance factor of the cable as shown in FIG. 1B. Accordingly, in order to compensate for the attenuation of the signals as mentioned above, data communication terminal equipment is generally provided with an equalization function. The aforesaid equalization function is an optional function and therefore, the equalization function appropriate to the status set by the user is effected. For example, when the user sets a cable length that is one of the optional items in the facsimile system as 0.0 Km, the equalization function is not effected. On the other hand, if the user sets the cable length as 1.8 Km or 3.6 Km, the equalization function appropriate to this cable length is effected. As discussed previously, in the conventional data communication terminal equipment, the user has to set the equalization function appropriate to the corresponding cable length in a setup menu and therefore, there is a problem in that in case that the equalization function inappropriate to the corresponding cable length is set or the set equalization function is not designated in setup menu, the communication is not completely established.

Ukegawa and Iizuka, et al., U.S. Pat. Nos. 5,150,400 and 4,736,249 each disclose facsimile apparatus which include training procedures prior to the normal transmission of documents. However, neither of these references teach or suggest the use of the handshake process signals to determine the equalization necessary for the telephone line as in the present invention.

SUMMARY OF THE INVENTION

Accordingly, it is an object of the present invention to provide an equalizing circuit and method of detecting status of signals received through a public telephone network to effect an equalization function so that the signals are not attenuated below a given level in data communication terminal equipment.

It is another object of the present invention to provide an equalizing circuit and method of detecting a reception signal upon performance of a protocol to thereby compensate for the attenuation and distortion of a received image data signal in a facsimile system.

To achieve this and other objects, in data communication terminal equipment in accordance with the present invention, an equalizing circuit comprises: a level detecting unit for detecting the respective levels of a high frequency signal and a low frequency signal which are inputted as frequency shift keying signals through a telephone line during a handshake; a control unit for comparing the levels of the low and high frequency signals detected by the level detecting unit and for generating a frequency compensation amplification control signal according to a level difference between the two signals; and an equalizer for inputting a level detection signal outputted from the level detecting unit and for compensating for the frequency attenuation and distortion of a received signal in response to the frequency compensation amplification control signal of the control unit, thereby effecting an equalization.

To achieve this and other objects, the present invention provides an automatic gain control method for data communication terminal equipment including the steps of detecting a level of a received protocol signal during a communication in accordance with a process of a protocol; detecting a two tone frequency shift keying FSK signal that is a handshake signal after detecting a level of the detected received protocol signal to check a status of a cable; setting a compensation parameter in accordance with a level difference of the two tones of the FSK signal forming the handshake signals; and effecting an equalization in accordance with the set compensation parameter prior to receiving data.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1A:
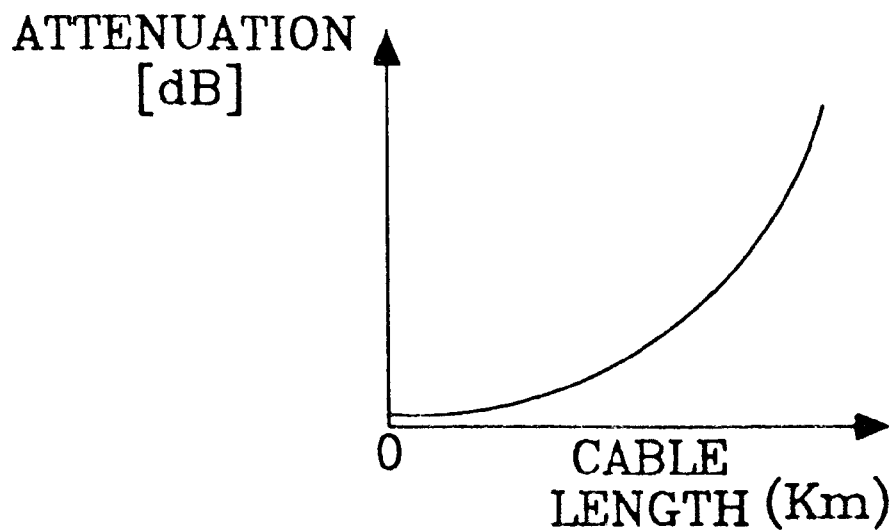
FIG. 1A is a characteristic curve illustrating an attenuation of a signal in accordance with a cable length of a public telephone network.
Figure 1B:
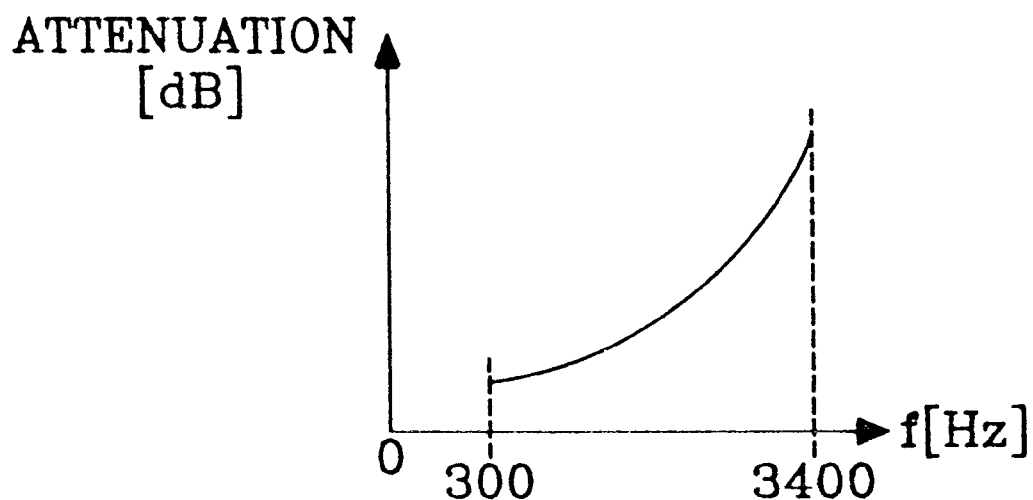
FIG. 1B is a characteristic curve illustrating an attenuation of a signal in each frequency band in accordance with a cable length of a public telephone network.
Figure 2:
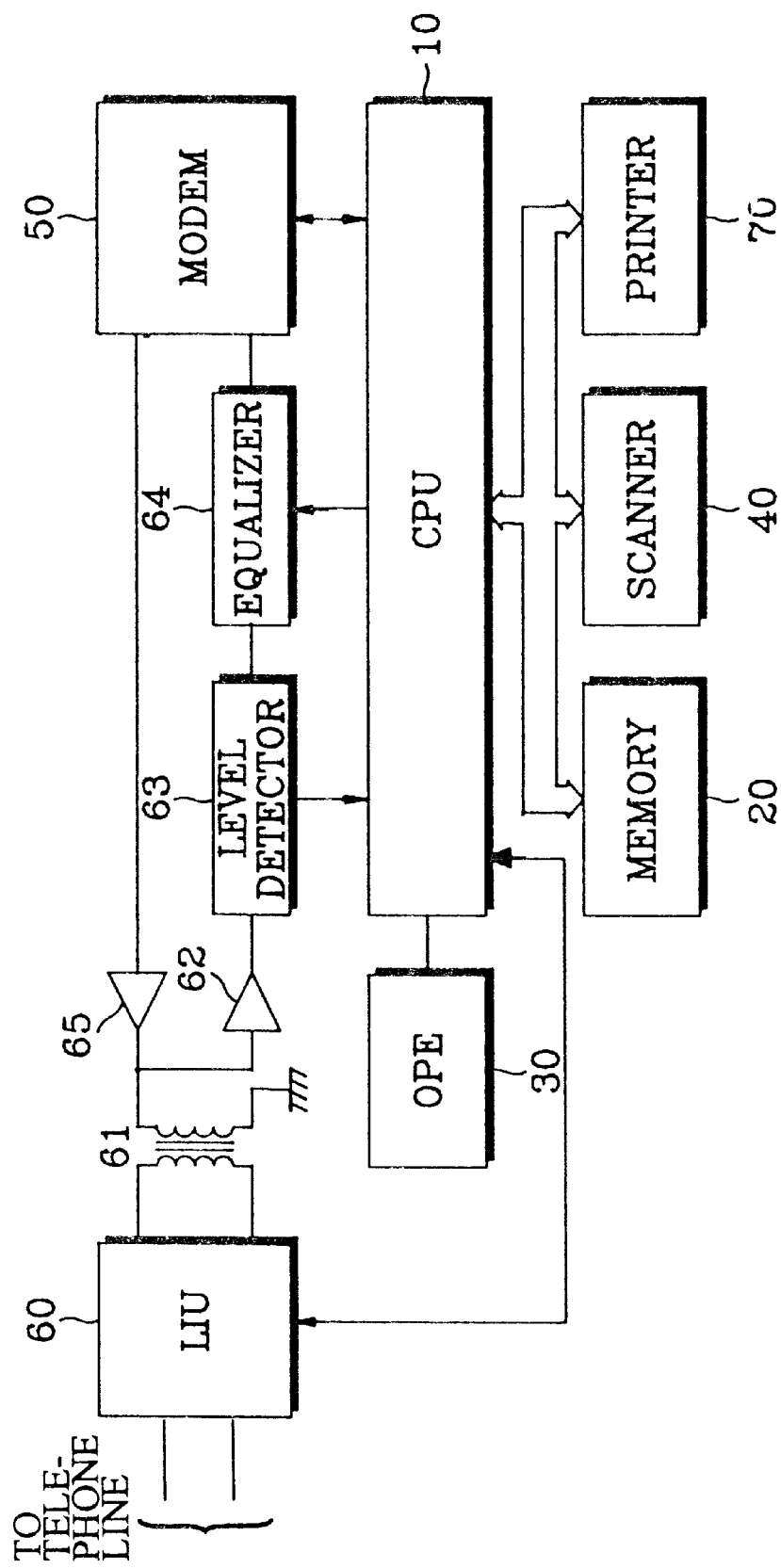
FIG. 2 is a block diagram illustrating a facsimile system constructed according to the principles of the present invention.

Turning now to the drawings and referring to FIG. 2, which is a block diagram illustrating a facsimile system constructed according to the principles of the present invention, a central processing unit CPU 10 controls the facsimile system according to a given program and compares detected levels of two low and high frequency signals occurring during the handshake so as to generate an equalization control signal in order to compensate for the attenuation and distortion of received signals according to a level difference of the two signals. A memory 20 stores the program including protocol data and character data, and accesses data under the control of the CPU 10. An operation panel OPE 30 has a plurality of keys for generating various key data, such as a dial key, a density setting key, a resolution setting key and a function setting key, etc., and a display unit for displaying data. A scanner 40 scans an image from a document to change it into the digital image data and then provides the digital image data to the CPU 10. A MODEM 50 converts output data of the CPU 10 into analog data and outputs it, and simultaneously converts received analog data into digital data and outputs it, under the control of the CPU 10. A line interface unit LIU 60 connects a speech loop of a telephone line and interfaces the signal of the MODEM 50 and the signal of the telephone line, under the control of the CPU 10. A transformer 61 is connected to the LIU 60 and matches an impedance characteristic between an exchange and a facsimile system. A first amplifier 62 amplifies a frequency shift keying signal inputted through the transformer 61. A level detector 63 detects the respective levels of the high and low frequency signals which are inputted as amplified frequency shift keying signals from the first amplifier 62 during a handshake. An equalizer 64 inputs the level detection signal outputted from the level detector 63 and compensates for the frequency attenuation and distortion of the reception signal in response to the equalization control signal of the CPU 10, so as to effect the equalization. A second amplifier 65 amplifies an analog signal outputted from the MODEM 50 and outputs the amplified analog signal. A printer 70 prints the received data according to the control signal of the CPU 10.

Figure 3:
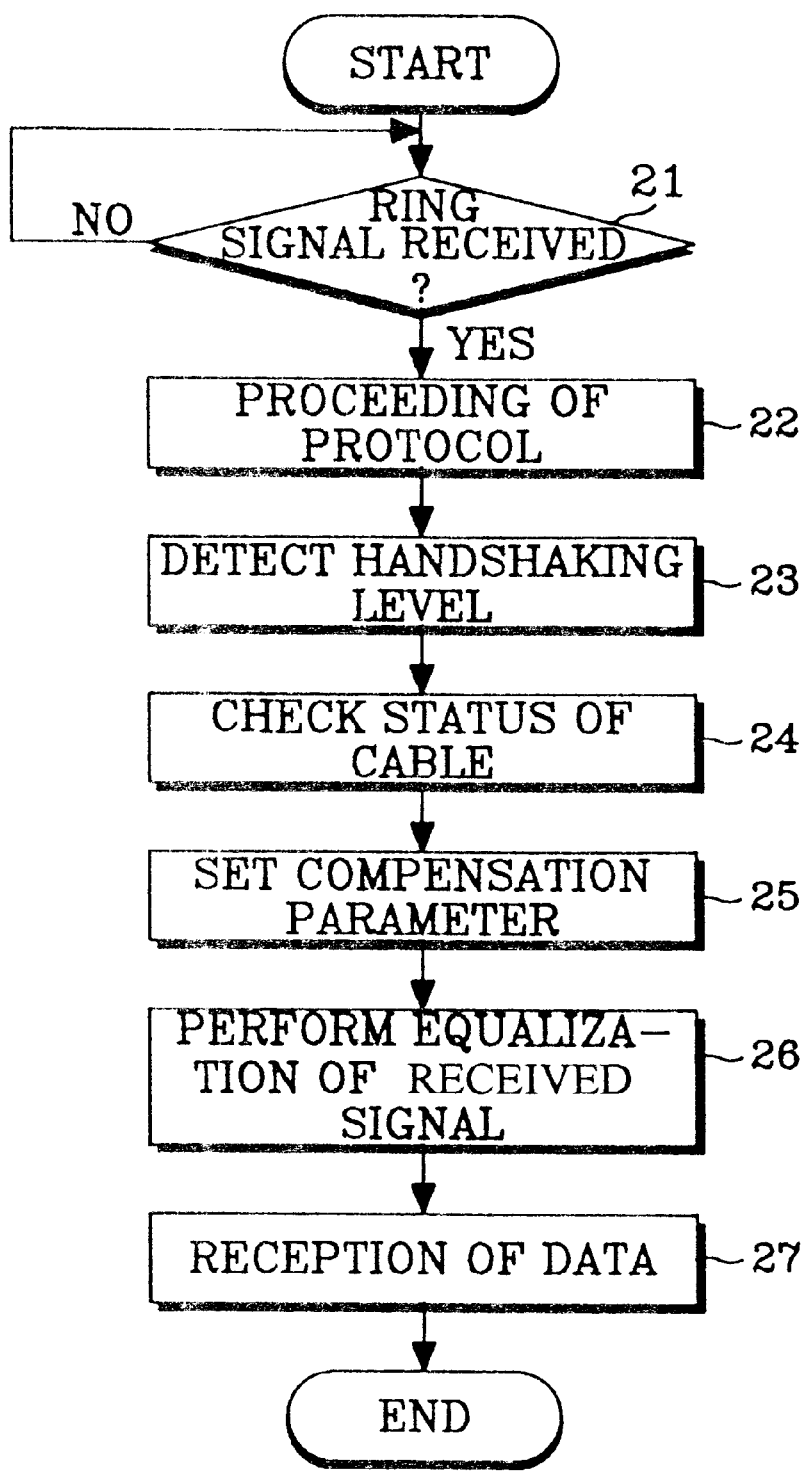
FIG. 3 is a flowchart illustrating the control procedure for compensating for the attenuation and distortion of received signals according to the present invention.

FIG. 3 is a flowchart illustrating the control procedure for compensating for the attenuation and distortion of the received signals according to the present invention. The aforesaid control procedure comprises the steps of: detecting a level of a received protocol signal in phase B during a communication in accordance with a process of a protocol; checking an FSK signal that is a handshake signal after detecting the level of the detected received protocol signal to check the status of the cable; setting the compensation parameter in accordance with a level difference of the handshake signals corresponding to the status of the cable; and effecting the equalization according to the set compensation parameter prior to receive data.

Figure 4:
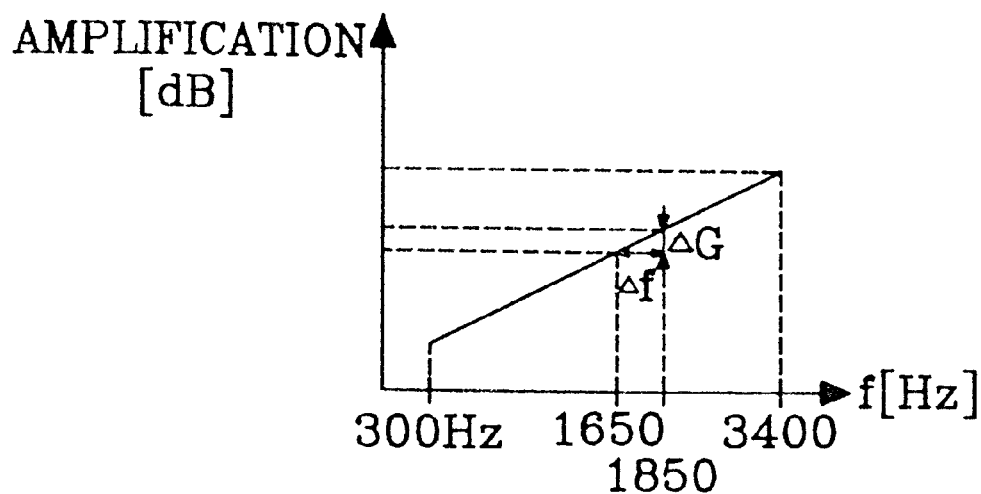
FIG. 4 is a characteristic graph for describing a compensation gain for each frequency according to the present invention.
Figure 5:
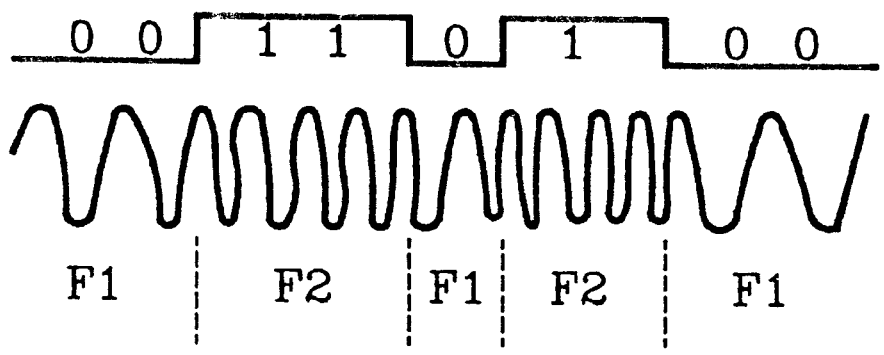
FIG. 5 is a waveform for use in describing a frequency shift keying method in accordance with the CCITT V.21 recommendation.

FIG. 4 shows a characteristic graph for use in describing the compensation gain for each frequency, and FIG. 5 shows a waveform for describing the frequency shift keying method in accordance with the CCITT V.21 recommendation.

With reference with FIGS. 2 through 5, the preferred embodiment of the present invention is explained below in detail.

In the data communication terminal equipment, the protocol is performed in order to form the unified communication status between the terminal equipment, that is, the handshake of the FSK signal is performed in order to establish the identical communication condition between two terminals in phase B during the protocol process. At this time, in the facsimile system, as prescribed in the CCITT V.21 recommendation, the FSK signal includes signals of 1650 Hz and 1850 Hz during the handshake while being divided into a low (0) signal and a high (1) signal as shown in FIG. 5. These handshake signals are interfaced through the LIU 60 and impedance-matched in the transformer 61 and are supplied to the first amplifier 62. The first amplifier 62 amplifies the received handshake signals by a given amount and outputs the amplified signals to the level detector 63. The handshake signals are composed of two signals of 1650 Hz and 1850 Hz, and the level detector 63 detects the levels of the two signals of 1650 Hz and 1850 Hz and outputs the detected levels to the CPU 10. However, in these signals of 1650 Hz and 1850 Hz which are the received handshake signals, the frequency thereof is distorted and also the levels thereof are attenuated according to the status of the cable. Particularly, as the cable length is extended, the high frequency signal (i.e., 1850 Hz) is attenuated more than the low frequency (i.e., 1650 Hz). Therefore, the data communication terminal equipment compares the levels of the 1650 Hz and 1850 Hz signals to check the status of the cable, and compensates according to the level difference value between the two signals, and thus the equalization is effected. Referring now to FIG. 3 for explaining the equalization function, the CPU 10 detects whether or not a ring signal is received in step 21, and then if received, proceeds to step 22 to thereby perform the protocol. And then, the received protocol signal is interfaced through the LIU 60 and impedance-matched in the transformer 61 and is supplied to the first amplifier 62. The first amplifier 62 amplifies the received protocol signal by the given level and outputs the amplified signal to the level detector 63. The level detector 63 detects the level of the protocol reception signal to provide the detected level to the CPU 10. In step 23, the CPU 10 detects the respective levels of 1650 Hz and 1850 Hz signals that are the received signals of the premessage procedure phase B. After then, the CPU 10 in step 24 compares the level difference values of the 1650 Hz and 1850 Hz signals to check the status of the cable. In step 25, the CPU 10 sets the parameter for compensating the received signal according to the level difference between the 1650 Hz and 1850 Hz signals. The high frequency factor is compensated more than the low frequency factor. The level difference value is expressed as $\Delta G$ and can be obtained by the following equation <1>.

$$\Delta G = 1650 \text{ Hz level} - 1850 \text{ Hz level} \qquad <1>$$

As shown in FIG. 4, each frequency band has a different compensation gain according to the compensation amplification rate in order to compensate the high frequency factor more than the low frequency factor, and the compensation amplification rate can be obtained by the following equation <2>.

$$\text{A compensation amplification rate} = \frac{\Delta G}{\Delta f},$$

wherein, $\Delta f$ represents a frequency difference.

When the frequency compensation parameter is set in this manner, the CPU 10 controls the equalizer 64 by the equalization control signal in accordance with the set compensation amplification rate in step 26 to compensate for the attenuation and distortion of the received signal detected by the level detector 63, and outputs the compensated signal to the MODEM 50. And then, the CPU 10 proceeds to step 27 to receive data.

The data communication terminal equipment as discussed previously detects the handshake level of the premessage procedure phase B according to a process of the protocol, and checks the status of the cable according to the handshake level to set the frequency compensation parameter. Then, the aforesaid data communication terminal equipment compensates for the attenuation and distortion of the received signal upon reception of image data, thereby enhancing the efficiency of the data reception.

It should be understood that the present invention is not limited to the particular embodiment disclosed herein as the best mode contemplated for carrying out the present invention, but rather that the present invention is not limited to the specific embodiment described in this specification except as defined in the appended claims.

What is claimed is:

1. An equalizing circuit for data communication terminal equipment, comprising:

a level detecting unit for detecting a respective level of a high frequency signal and a low frequency signal which are frequency shift keying signals inputted through a telephone line during a handshake process and for outputting the detected respective levels;

a control unit for comparing said levels of the high and low frequency signals detected by said level detecting unit and for generating a frequency compensation amplification control signal according to a level difference between said high and low frequency signals; and an equalizing unit for inputting a level detection signal outputted from said level detecting unit and for compensating any attenuation and distortion of received signals in response to said frequency compensation amplification control signal of said control unit, thus effecting equalization.

2. The equalizing circuit as claimed in claim 1, wherein said equalizing unit compensates said high and low frequency signals according to a amplification factor set in accordance with a level difference value thereof.

3. An equalizing method for data communication terminal equipment, comprising the steps of:

detecting levels of received protocol signals during communication in accordance with a process of a protocol;

checking frequency shift keying signals comprising handshake signals after detecting levels of the detected received protocol signals to detect a status of a cable;

setting a compensation parameter in accordance with a level difference between the frequency shift key signals comprising the handshake signals, the level difference corresponding to the status of the cable; and performing an equalization in accordance with the set compensation parameter prior to receiving data.

4. The equalizing method as claimed in claim 3, wherein the frequency shift keying signal is composed of low and high frequency signals.

5. The equalizing method as claimed in claim 4, wherein the compensation parameter compensates the high frequency signals more than the low frequency signals.

6. The equalizing circuit as claimed in claim 1, the high frequency signal being 1850 Hz and the low frequency signal being 1650 Hz.

7. The equalizing circuit as claimed in claim 2, the high frequency signal being 1850 Hz and the low frequency signal being 1650 Hz.

8. The equalizing method as claimed in claim 3, the frequency shift keying signal being composed of a 1850 Hz signal and a 1650 Hz signal.

9. The equalizing method as claimed in claim 4, the high frequency signal being 1850 Hz and the low frequency signal being 1650 Hz.

10. The equalizing method as claimed in claim 5, the high frequency signal being 1850 Hz and the low frequency signal being 1650 Hz.

* * * * *